3,001,571
SYNTHETIC MICA FLAKES AND STRUCTURES
Robert A. Hatch, White Bear Lake, Minn., assignor to Minnesota Mining and Manufacturing Company, St. Paul, Minn., a corporation of Delaware
No Drawing. Filed Aug. 5, 1957, Ser. No. 676,426
22 Claims. (Cl. 154—2.6)

This invention relates to synthetic mica products, and particularly to extremely thin platelets of synthetic mica, stable suspensions of synthetic mica, and synthetic mica sheet material. The invention is also directed to processes of forming the aforenoted products.

Natural water-containing micas in sheet material form are available today, but they tend to eliminate water at raised temperatures from about 500 to 800° C. and to disintegrate in doing so. While plates of natural mica have been formed into films having good tensile strength, immersion of such films in water causes them to disintegrate almost instantaneously.

Synthetic fluorine mica, which has improved high temperature stability, has received much attention as a replacement for natural mica in high temperature uses; however, in reconstituted sheet or paper form such synthetic mica has heretofore possessed somewhat less than the desired degree of tensile and flexural strength. Known sheets consisting of plates of synthetic mica without organic binders are weak mechanically, crack on bending or flexing, and are difficult or impossible to handle in mechanical stamping operations such as in the automatic stamping of vacuum tube spacers.

This invention provides, among other things, flexible sheet materials of synthetic fluorine mica, with or without binders or the like, which have high tensile strength, and which additionally can be creased and folded without cracking or fracturing at the fold line. The improved mechanical properties of these sheet materials render them easily handled in stamping operations such as employed in the manufacturing of vacuum tube spacers and the like. Additionally, this invention provides synthetic mica sheet materials which possess good high temperature stability and show good resistance to disintegration when immersed in water. Additionally, this invention provides synthetic mica sheet materials having smooth surfaces capable of being printed and written upon, and which are suitable as fireproof paper material for use in forming permanent document records and the like.

By the practice of this invention, improved synthetic mica sheet materials can be formed which, when stamped or cut in automatic manufacturing operations, do not fray or release small flakes of mica at the line of cut, whereas prior art reconstituted synthetic mica sheet materials have generally frayed and flaked at lines of cut, thus rendering them unsuitable for use as vacuum tube spacers formed by stamping operations.

While sheets of synthetic mica having the aforenoted desired properties can be prepared according to this invention without the necessity of employing special binders, nevertheless, various organic binders or materials, as well as inorganic materials, may be useful as constituents of sheet materials formed using the mica platelets hereof. For example, sheet materials consisting of my mica platelets may be impregnated with such materials as lead acetate, silicones, etc., to gain improvements as imparted to the sheet material by such compositions. On the other hand, the necessity for using such materials as binders or the like may be avoided by the practice of this invention. Flexible crack-resistant mica sheets of high tensile and flexural strength can now be prepared so as to consist of synthetic mica alone.

Further provided by this invention are a variety of composite sheet materials having improved tear resistance and wet strength characteristics. For example, blended mixtures of my mica platelets and various fibers, e.g., cellulose fiber, cotton fiber, nylon fiber, etc., can be formed into sheet materials which possess good wet strength and improved handling characteristics. Combinations of my mica platelets with inorganic fibers, e.g., fiberglass, asbestos fibers, metal filaments, etc., can be formed into sheet materials of enhanced tear strength. Also, mica platelets of this invention can be combined with flakes of other materials, e.g., flakes of various synthetic or natural micas, or clay minerals, to form composite structures or sheet materials of improved handling properties and the like.

For the most part, synthetic micas of the prior art have been delaminated and separated into plates by means acting externally on the mica crystal. An example of such known externally operating means, is the use of jets of fluid media or grinding to delaminate the mica crystals. These prior art techniques, used on known commercial synthetic micas, have not been found satisfactory to produce extremely thin synthetic mica platelets of large surface area. Using electron microscope techniques for measuring plate thickness, synthetic mica plates resulting from the aforenoted treatments have generally had thicknesses at least in excess of about 250 angstrom units (A.U.), usually on the order of 1000 A.U. (0.1 micron), or more.

Furthermore, such known plates of mica have had relatively small surface areas, or width and length measurements, in planes perpendicular to their thickness. For convenience of expression, the term "diameter" is used herein to designate the approximate size of surfaces of platelets in planes perpendicular to their thickness. As used herein, "diameter" is defined as the square root of the product obtained by multiplying ($a$) the length of the longest straight line which extends across a platelet in a plane perpendicular to its thickness (i.e., in its plane of basal cleavage) and which divides the platelet into approximately equal parts, by ($b$) the length of the shortest straight line which extends across said platelet in a plane perpendicular to its thickness dividing it into approximately equal parts.

One of the major benefits of this invention is that now, for the first time insofar as I am aware, there is provided masses of synthetic mica platelets which are not only extremely thin, being thinner than any prior art platelets with which I am familiar, but also which have extremely large surface areas or "diameters," as aforedefined. The thin synthetic mica platelets of this invention generally do not exceed a thickness of 100 A.U., and range in thickness from about 10 to 100 A.U. (i.e., about 1 to 10 unit cells thick), as determined by means of the electron microscope. Additionally, they have a ratio of average diameter to thickness in excess of 100:1, and extending upwards to 1000:1, or even higher. It is this high diameter to thickness ratio in combination with the extreme thinness of my platelets which renders them distinctive, and in large part accounts for the improved characteristics of sheet materials formed therefrom.

Even with the large average diameter of my synthetic mica platelets, they are so thin that stable suspensions of them in liquid media are possible; and they are useful as fillers or thickeners for paints and other liquid or paste or solid materials. They are also useful as absorbents for antibiotics and other pharmaceuticals, etc. In water or other liquid suspension, they are particularly useful in forming flexible sheet materials, as will further be explained.

Based on past experience with synthetic micas, it is indeed surprising that extremely thin platelets having large average diameters (for example, some platelets as thin as 10 A.U. have been found to have diameters of 3 to 4 microns) can actually be formed from synthetic mica material. Such has now been made possible, however, by the discovery and utilization of a unique property characteristic of certain synthetic mica materials, as will be shown.

The general formula for the mica family of layer-structure crystalline compounds may be characterized by $$X_{0.5 \text{ to } 1.0} Y_{2 \text{ to } 3} Z_4 O_{10} (OH,F)_2$$

where X refers usually to large univalent or divalent cations with ionic radii generally greater than about 1 A.U., for example, potassium ($K^+$), but may be a smaller cation such as sodium ($Na^+$), or lithium ($Li^+$), or other cations such as rubidium ($Rb^+$), thallium ($Tl^+$), cesium ($Cs^+$), calcium ($Ca^{++}$), strontium ($Sr^{++}$), barium ($Ba^{++}$), and lead ($Pb^{++}$).

Y refers to intermediate-sized cations (0.6 to 0.9 A.U.), for example, aluminum ($Al^{+++}$) or magnesium ($Mg^{++}$), but may be a cation such as iron ($Fe^{++}$), cobalt ($Co^{++}$), or nickel ($Ni^{++}$); and even include, with magnesium, such cations as manganese ($Mn^{++}$), lithium ($Li^+$), titanium ($Ti^{++}$), zinc ($Zn^{++}$), and copper ($Cu^{++}$).

Z refers to small, highly charged cations. In the great majority of micas, the four Z positions are occupied by 3 silicon ($Si^{4+}$) cations plus 1 aluminum ($Al^{3+}$) cation. O in the above formula refers to the oxygen anion, OH to the hydroxyl anion commonly present in most natural mica, and F refers to fluorine which usually substantially completely replaces OH in the synthetic mica products of this invention. It is possible that other halogens than fluorine may function as the equivalent of fluorine in synthetic mica compositions.

The basic unit (building block) of mica structures is the $(Si,Al)O_4$ or $Z—O_4$ tetrahedron. These are linked together along the base to form a hexagonal network sheet, the oxygen anions at the apices of the pyramids all pointing in the same direction. The hydroxyl or fluorine anions fit into the hexagonal holes outlined by the apex oxygens. The simplest structure preserving the composition of mica contains two such sheets bonded together with the Y position cations in 6-fold coordination. Successive double layers are bonded together through X position cations which fit into hexagonal holes outlined by the bases of the $(Si,Al)O_4$ linked tetrahedra.

Most of the existing patents dealing with commercially interesting synthetic mica compositions pertain to the trisilicic fluor-phlogopite ($KMg_3AlSi_3O_{10}F_2$) and isomorphic derivatives thereof, see for example, U.S. Patent Nos. 2,185,280, 2,645,060, 2,675,853, 2,741,877.

A small sub-family of the fluorine-mica family are the so-called tetrasilicic micas which may be characterized by the general formula:

$$X_n Y_{2.5 \text{ to } 3} Si_4 O_{10} F_2$$

where X is a cation as above described or a molecule such as LiF, and Y refers to intermediate-sized cations as aforenoted. "n" in this formula is usually 0.5 to 1 where X is respectively a divalent or a monovalent cation, but may be 1, 2 or 3 where X is a molecule such as LiF. Some illustrative compositions of this tetrasilicic type are:

(a)         $KAlLi_2Si_4O_{10}F_2$
(b)         $KMg_{2.5}Si_4O_{10}F_2$
(c)         $KMg_2LiSi_4O_{10}F_2$
(d)         $NaMg_{2.5}Si_4O_{10}F_2$
and
(e)         $NaMg_2LiSi_4O_{10}F_2$ Mica products of the tetrasilicic fluorine type are of primary interest herein.

I have noted that sodium tetrasilicic mica (represented by formulas d and e above), as compared for example, with the potassium analogs (represented by formulas a, b, and c above), possess a surprisingly pronounced ability to absorb water in their layer structure and be swelled by the water in a subsequent heating step. This ability to absorb and be swelled by water, while characteristic of these sodium tetrasilicic fluorine mica, is not limited solely to such micas, and is not due solely to the presence of sodium, as shown by the fact that sodium trisilicic mica ($NaMg_3AlSi_3O_{10}F_2$) does not possess this pronounced ability to absorb and be swelled by water, and by the further fact that other synthetic tetrasilicic micas not containing sodium also have been found to possess this property. For example, while its composition is not accurately known, one such illustrative water-swelling tetrasilicic mica which is free of sodium may be characterized approximately by the general formula $$(LiF)_n Mg_2 LiSi_4 O_{10} F_2$$

where n is 1, 2 or 3.

With respect to the process for the practice of the instant invention, it is these water-swelling tetrasilicic fluorine micas which are of particular interest. Illustrative water-swelling tetrasilicic fluorine type synthetic micas other than those aforenoted are isomorphic analogs of $NaMg_{2.5}Si_4O_{10}F_2$ and $NaMg_2LiSi_4O_{10}F_2$, including possible lithium and calcium isomorphic replacements for sodium and possible aluminum isomorphic replacement for magnesium. Additionally, in either the magnesium or aluminum isomorph, or in a mixed magnesium and aluminum isomorph, some magnesium or aluminum may be isomorphically replaced by ferrous iron ($Fe^{++}$), cobalt ($Co^{++}$), nickel ($Ni^{++}$), divalent manganese ($Mn^{++}$), zinc ($Zn^{++}$), or mixtures thereof.

While I employ water-swelling tetrasilicic micas as starting materials in the process of my invention, I have found that it is now possible to prepare extremely thin, large-surface-area platelets of non-water-swelling synthetic fluorine micas, even though the basic structural characteristics or building units and the properties of such micas would not indicate that such is possible.

Basically, for the practice of this invention, the synthesis of water-swelling tetrasilicic fluorine mica should be accomplished by the fusion of a raw material batch to a clear melt followed by slow cooling (i.e., about a 5° C. or less temperature drop per hour) and crystallization. In this process, well developed layer structure crystals grow during the slow cooling of the melt owing to the high degree of mobility of the ions in the melt. Suitable furnaces and techniques which are useful for producing synthetic mica of satisfactory properties to employ in the practice of this invention are known in the art.

Synthetic mica prepared according to the aforenoted process has a much higher degree of chemical purity than can be depended upon even from natural mica. Worthy of note is the fact that synthetic water-swelling tetrasilicic micas which are crystallized slowly from properly compounded melts furnish crystals of much larger size and of improved structural perfection that can be found, for example, even in materials such as bentonite, montmorillonite, and hectorite found in nature. As distinguished from these materials of nature, which usually form fibrous networks in a film, my discrete platelets of mica form films and sheet materials by overlapping upon each other and by positioning the planes of basal cleavage of the platelets in coherent intimate contact.

As water-swelling mica comes from the furnace, it is in large blocks having a hardness requiring a chisel to crack the same, but it surprisingly is readily reduced to a free-flowing mass of individual crystal granules by soaking in water. Hot water serves to break up the blocks more rapidly than cold, it requiring only about 30 minutes to break down a one foot cube of sodium tetrasilicic fluorine mica in hot water held at about 212° F. Further reduction in the thickness of the mica crystal granules is accomplished by subjecting them to air drying followed by rapid heating in a suitable furnace to any temperature in the range of about 300° to 550° C. During heating, rapid release of steam derived from the absorbed water between the potential basal cleavage planes of the mica causes the granules to exfoliate and swell up to several times (about 5 to 20 times) their thickness prior to such treatment. In this step, partial cleavage or splitting of each mica granule or crystal occurs along its multitude of basal cleavage planes in a manner analogous to that occurring when natural mica is raised around 800° C. However, the swelling of water-swellable tetrasilicic fluorine micas, as here discussed, is accomplished at a much lower temperature and progresses to a much greater degree than that occurring upon heating natural mica even to greatly higher temperatures. Also, in the heat treatment of natural mica hydroxyl ions are thrown off and the mica structure altered, whereas in the process of treating synthetic mica as here discussed, no such alteration of the mica structure itself occurs because absorbed interlayer water is involved. The water used to cause exfoliation of synthetic mica is first absorbed in the interlayer structure of the mica in a separate preliminary step.

After the above swelling or "bloating" treatment, which may be repeated several times, the dehydrated mica is further delaminated, preferably using techniques which also aid in its purification. Since small amounts of occluded glass and fluoride phases are almost invariably produced in the synthesis of mica, even when due precaution is taken to avoid such impurities, and since such impurities serve to detract from the properties of flexibility and strength desired in a self-bonded mica sheet such as to be described, it is desirable to remove them as soon as convenient in processing. Conveniently this can be done by placing the exfoliated mica in water, allowing it to rehydrate, and then subjecting it to a short mild agitation treatment such as brief ball milling or beater treatment, after which the freed occluded impurities can be removed from the mica by a variety of standard techniques based on differences in specific gravity or differences in particle size and shape, etc.

A high sodium content in mica tends to deleteriously affect its electrical properties; to overcome this defect, leaching of some sodium from the sodium variety of water-swellable mica may be accomplished simultaneously with purification.

In conducting purification and further delamination of the heat exfoliated or swelled mica, I may again place it in aqueous medium, such as distilled, deionized, or other suitably pure water. Leaching and delamination of the mica may be conducted simultaneously by boiling the water in which the mica is suspended. Slight acidification of the water aids in leaching sodium, but strong acid solutions are to be avoided because they decompose the mica. Gentle agitation with an air stirrer or other means is useful as an aid to delamination which, at this point in the deionized water process, proceeds slowly. Even some mild grinding action may be used at this point to facilitate delamination. As the water is boiled and the mica concentrates, the pH of the water increases in alkalinity due to liberation of sodium or other alkali ions from the mica structure. The mica so treated can conveniently be separated from the sodium or like ions removed from its structure by gravity settling, with decantation of the supernatant liquor, or it can be concentrated by using a centrifuge. Other methods, of course, may be used. For example, the sodium ions may be removed by a process of dialysis, or with a suitable cation exchange column. Whatever method is used, sodium ions in the water solution are preferably removed therefrom and the mica subjected to further boiling or steam autoclave treatment until it is delaminated to the desired state of thinness, i.e., to a total thickness between about 10 and 100 A.U. Suitably, delamination to such fine thinness is accomplished by long continued boiling and agitation of the sol. Additionally, for example, methods involving the use of supersonic vibrations, or reduction of air pressure to cause gas entrapped in planes of basal cleavage to expand, may also be used to advantage.

As a further alternative, or additional treatment, heat exfoliated mica may be placed in sodium carbonate solutions, or solutions of other latent gas releasing agents (for example, hydrogen peroxide) which aid in further delamination without adversely affecting the properties of the mica. In such solutions, the exfoliated mica is allowed to rehydrate and pick up sodium carbonate or equivalent between its planes of potential basal cleavage. The sodium carbonate treatment is followed by the addition of an acid, for example, hydrochloric acid, to the mica in suspension. The added acid chemically reacts with absorbed sodium carbonate and causes a release of carbon dioxide within the interlayer structure of the mica, which in turn forces the mica to cleave or split in the planes where gas is released.

Periodically during delamination, flakes of suitable thinness may be separated from residual coarser flakes. This is conveniently done by allowing a sol of mica particles in a liquid vehicle such as water to stand quietly for at least about 24 hours to allow the coarser mica flakes to settle out, and then decanting off the remainder of the suspension from which the superfine mica can be recovered by evaporation, centrifugation, coagulation, or other techniques. As aforediscussed, it is this extremely thinly split mica which has large surface area that makes the strongest films.

While I do not wish to be bound by theory, it is my opinion that the ultra thin, and therefore highly flexible, mica platelets of this invention having a high ratio of average diameter to thickness permit a large amount of overlap between adjacent mica platelets when they are formed into a film or sheet, and that this large amount of overlap between adjacent platelets to a great extent allows for full utilization of cohesive forces such as van der Waals' forces between platelets, and accounts for the superior strength and flexibility of my films as compared to films prepared from thicker mica plates which lack the significantly higher ratio of diameter to thickness characteristic of the platelets hereof. This appears to be confirmed by the fact that examination of my platelets by means of the electron microscope reveals that they have a total thickness not greater than about 100 A.U., have large diameters as aforenoted, and are highly flexible and conform closely and intimately to the contour of adjacent surfaces of particles. They even conform to slight scratches in glass which are undetectable to the naked eye.

In forming extremely thin platelets of synthetic fluorine mica of the type which is not water-swelling, and therefore which would appear impossible to form into the extremely thin platelets of large average diameter as aforediscussed, I take extremely thin platelets of water-swelling mica prepared as above and subject them to processes which may be characterized as a "cation exchange," whereby sodium ions, or other X position or other cations in the mica platelet structure are replaced by ions known to function, from a structure standpoint, in a manner analogous to the ions originally present in the water-swelling mica crystal structures. For example, the sodium of finely delaminated platelets may be replaced by $K^+$ or $Ba^{++}$ to gain improved electrical properties and high temperature stability. $Ba^{++}$ and $Al^{+++}$ replacement of $Na^+$ is particularly effective to give platelets which impart improved wet strength and water resistance to mica sheets formed therefrom. Other ions also may be substituted for certain ions in the water-swelling variety of mica. For example, the sodium ions may be replaced by ions such as $Tl^+$, $Rb^+$, $Cs^+$, $Ca^{++}$, $Sr^{++}$, $Mg^{++}$, $Ag^+$, $Pb^{++}$, $NH_4^+$, etc. Thus, extremely thin platelets of synthetic mica having formulas which would indicate that they are not swellable in water—and which, therefore, would indicate that they could not have been broken down to the extreme thinness and the large diameter possible with water-swelling micas as herein taught—are now made possible by the practice of this invention.

Additionally, I have found that, by using acid exchange resins, my mica platelets may be formed so as to have substantially all of their sodium ion content replaced by hydrogen ions.

The thin, large-surface-area mica platelets of this invention form stable suspensions in water with mica concentrations ranging from only a few percent up to about 30 or 40%, or even more, by weight. My suspensions of mica may be in sol or gel form depending on concentration and the time the suspended mica is allowed to remain essentially undisturbed. Gel formation tends to proceed most rapidly where higher concentrations of suspended mica are allowed to stand undisturbed. Other liquid media, for example, ethyl alcohol, toluene, etc., may also be used as the suspending medium.

Mica sheets or films of this invention are preferably formed from dilute, sol state suspensions of my platelets. Illustrative techniques which may be used are centrifugation casting, deposition by cataphoresis, or deposition on a clean smooth surface followed by evaporation. Other methods, however, are possible to use. For example, a gel-like mass of my platelets suspended in water may be diluted with water to lower its viscosity so that it is almost flowable, and then this suspension may be formed into sheets or films by knife coating, roll coating, and extrusion techniques. For the first time, therefore, it now becomes possible to employ simple techniques such as knife coating to form synthetic mica sheet materials which are integral and have suitable tensile and flexural strength so as to be handleable for commercial operations. For best film strength, however, spin casting or similar techniques are preferred.

Using my platelets, conventional paper forming processes such as those involving us of a Fourdrinier screen can be employed. For example, my platelets in liquid suspensions (solids concentration may be as low as 0.1% by weight) may first be flocculated by the addition of a flocculating agent such as acetone, isopropyl alcohol, potassium nitrate, barium nitrate, aluminum chloride, etc., and the flocs of mica then flowed onto a screen (or picked up from the flocculated slurry by a drum-type paper former). In general, the higher the concentration of mica platelets in liquid at the time the flocculating agent is added, the closer together the mica platelets will be, and therefore, the stronger the floc will be. In some cases this may be important so as to avoid breaking up of the flocs and their passage through the screen employed in forming the reconstituted mica sheet. For best results in flocculation, it is also desirable to employ mica platelets hereof which contain not more than about two-thirds of their original theoretical sodium ion content. Leaching and/or cation exchange may be employed, as aforedescribed, to reduce the Na+ content.

Water or other liquid should be removed from films or sheet materials of my platelets to render them conveniently handleable as self-supporting materials and endow them with the improved strength characteristics. In order to avoid blistering of a film during water removal steps, it is preferred to dry the film at one atmosphere of pressure and at a temperature less than 100° C. preferably at room temperature, until only about 10% or less water remains. After such drying, the film can be readily reduced to a water content of 1 or 2 percent by careful heating up to about 200° C., and then essentially completely dehydrated by heating it to temperatures on the order of 550° C. to 600° C. Dehydration of my sheets also is promoted by extensive to complete cationic replacement of the sodium by potassium in the mica structure. Dehydration can also be accomplished by a replacement of water in the films with acetone or other similar liquid volatile vehicle, as by soaking the sheet of hydrated mica in acetone for several hours, or until translucency develops in the mica sheet. Where acetone or the like is used, later removal of it from the sheet of mica can be accomplished at a much lower temperature than possible in the case of water.

Where reduced flexibility of films is permitted, recrystallization of the mica in sheet structure form can be accomplished by heating to elevated temperatures in the range of about 600° to about 1100° C.

Where desired, calendering of my films or sheet materials may be accomplished to impart improved surface characteristics thereto.

As specific but non-limitative examples of mica platelets, suspensions and films or sheet materials of this invention, and methods for making the same, the following is offered:

EXAMPLE 1

The following chemicals in powder form were proportioned by weight as indicated, and dry blended by ball milling for about 30 minutes to form a uniform mixture.

|  | Percent by weight |
|---|---|
| ⅝ mol of NaF | 8.92 |
| 1/12 mol of $Na_2SiF_6$ | 3.99 |
| 2 mol of MgO | 20.55 |
| 1 mol of LiF | 6.61 |
| 3 11/12 mol of $SiO_2$ | 59.93 |

The formulation represents an excess of about ⅓ mol of fluorine in the batch, which was included to compensate for loss by volatilization during firing. The total weight of batch prepared was about 240 lbs. This was packed into a steel jacketed furnace and an inner core of the batch was melted and crystallized in about 16 hours by an internal electric resistance melting process similar to that described in U.S. Bureau of Mines Report of Investigation #5283, December, 1956.

After slow cooling for a day, a block of mica crystal aggregates having the general formula $NaMg_2LiSi_4O_{10}F_2$ and weighing approximately 130 lbs. was broken out of the mass and placed in a tank of boiling water. Within two hours it had absorbed interlayer water and swelled progressively, causing the block to disintegrate to granules (⅛ to ¼ inch average size) of individual mica crystals.

The wet granular mass was passed through a 4-mesh screen to remove the coarse impurities (pieces of carbon electrode, furnace lining), and then through a 60-mesh screen to remove a small amount of the fine-grained solid state reacted mica which surrounded the inner fully reacted portion of the mica mass. Approximately 95% of the mica was recovered, and this cleaned material was then air dried.

Next, the air-dried mica granules were passed through a small rotary kiln at a temperature of 450° to 500° C. The rapid release of the absorbed interlayer water caused the mica granules to swell in a direction perpendicular to their planes of potential basal cleavage, expansions up to at least 10 times the original thickness being noted.

EXAMPLE 2

The "popped" mica of Example 1 was rehydrated by soaking in water for a few hours, then placed in a ball-mill for about a 15 minute period of grinding. Occluded glass in the mica was reduced in particle size much faster than was the mica, and was removed from the mica by screening it through a 150-mesh screen, which held back approximately 80% of the mica, now essentially glass-free.

Leaching and further delamination of the mica was accomplished by boiling it for 24 hours in about 50 gallons of deionized water. After another 24-hour period of cooling and settling of the coarse mica particles, the fine particles remaining in the suspension were decanted into a clean storage tank. A second, third, and fourth boiling-leaching, settling, and decantation operation was carried out on the residual coarse-grained mica to produce more superfine mica having a thickness not over 100 A.U. and ratio of average diameter to thickness over 100. One-third to one-half of the original sodium ion content of these platelets was removed during the aforenoted processing.

The accumulated colloidal mica was maintained suspended in water and was at a concentration of about 0.5% solids. This suspension was concentrated in a centrifuge to an 8% mica gel in one case, 18% gel in another, and 30% gel in still another case. All of the samples formed gels which were stable and could be stored.

EXAMPLE 3

One gel sample from Example 2 was converted to a sol state by dilution with water to a 4% by weight concentration of mica. It was then knife coated on the surface of an aluminum foil using a knife-gap of 20 mils, and a rate of draw of 6 to 12 inches per second. Upon air-drying, followed by gentle heating to 200° C. for 2 hours and a brief heat treatment at 550° C., a sturdy handleable film approximately 1 mil thick was obtained. By varying the consistency of the sol and the opening of the knife-gap, films as thin as 0.2 mil and as thick as 10 mils were formed. As an illustration of the tensile and flexural strength of a film prepared according to this technique, one such film having a thickness of 1.5 mils, had a tensile strength of about 7,500 p.s.i. and could be folded without cracking and parting at the crease line.

EXAMPLE 4

To approximately 10 grams of the 8% gel of Example 2 was added about 100 cc. of hot distilled water and the mica in the gel dispersed throughout the water to form a slurry. This suspension or slurry of mica was then used to test the formation of mica films by spin casting using an aluminum cup having an internal diameter of 3 inches lined with a removable film of "Teflon," and a speed of 3450 revolutions per minute for casting. While hot, the slurry was poured into the spinning cup, and spinning was continued until all the water had evaporated (in about 16 hours of normal air drying, in about 4 hours with forced drying using a heat lamp). Several films ranging from 1 to about 3 mils thick were spun cast using different concentrations of mica sol. After dehydrating these films at 240° C. to reduce their water content to less than about 2%, tensile strength measurements were made and found to range from 8,000 up to about 17,000 p.s.i. Good flexural strength was indicated in all cases by the fact that the sheets could be sharply bent and creased without breaking at their crease line.

EXAMPLE 5

The thermally bloated or "popped" material of Example 1 was immersed and boiled for 4 hours in a concentrated water solution of sodium carbonate to thoroughly saturate the partly split mica along its cleavage planes. After draining off excess solution and air drying the bloated particles of mica, they were immersed, while stirring, in a 25% solution of sulfuric acid. Immediately upon contact with the acid, further swelling of the mica particles up to 10 to 20 times their bloated thickness occurred. After this treatment, remaining acid was neutralized with sodium carbonate. The expanded mica in suspension, now highly gelatinous, was poured into a centrifuge filter and washed with distilled water until no further test for sulfate ion was obtained using barium chloride solution. The resulting mica gel was then boiled in water suspension and gently agitated to separate the loosened laminae. Resulting platelets had a thickness not in excess of 100 A.U. and a ratio of average diameter to thickness in excess of 100.

Instead of sodium carbonate, one may employ potassium carbonate in the above treatment, and thereby accomplish a substitution of potassium ions for sodium ions simultaneously with the step of acid delamination. This alternative procedure, however, is to be used with caution inasmuch as once a complete replacement of sodium by potassium is obtained, further delamination of the mica to a superfine state retaining large surface area for the platelets becomes impossible by the simple techniques set forth herein.

EXAMPLE 6

A 100 cc. portion of the superfine mica suspension of Example 5 containing about 1% of mica platelets was formed into a film by a spin casting and drying using the technique and conditions described in Example 4. A film 1 mil thick having improved tensile strength and a high degree of flexibility as aforesetforth was obtained. This film could be folded upon itself and creased without breakage or parting at the fold line. It was easily handled without breakage and was suitable for use in mechanical stamping operations.

EXAMPLE 7

Samples of mica film prepared according to Example 4 were subjected to cation exchange. First, several hot baths were prepared from highly concentrated aqueous solutions of several salts: bath A containing potassium formate; bath B containing potassium nitrate, etc., as set forth in Table I. Small 1 by 2 inch sheets of the spun-cast mica paper of Example 4 were immersed in each bath and maintained therein at a temperature of 200° F. for 60 hours. The sheets were then removed, and rinsed and soaked in distilled water to remove any residual excess salt solution. They were then dried carefully by first drying for 4 hours at room temperature, then for 2 hours at 95° C. and finally at 200° C. for about 2 hours. Chemical analysis of the resulting degree of substitution of specified ions in the mica sheets is set forth in Table I.

*Table I*

| Bath | Pertinent Analysis of Product | | Theoretical [1] |
|---|---|---|---|
| A—HCOOK | 0.4% Na$^+$ | 8.5% K$^+$ | 9.6% K$^+$. |
| B—KNO$_3$ | 0.4% Na$^+$ | 7.1% K$^+$ | 9.6% K$^+$. |
| C—AlCl$_3$ | 0.2% Na$^+$ | 2.8% Al$^{+3}$ | 2.4% Al$^{+++}$. |
| D—BaCl$_2$ | 0.1% Na$^+$ | 9.3% Ba$^{++}$ | 15.8% Ba$^{++}$. |
| E—Ba(NO$_3$)$_2$ | 0.1% Na$^+$ | 9.2% Ba$^{++}$ | 15.8% Ba$^{++}$. |
| F—Ba(ClO$_3$)$_2$ | 0.1% Na$^+$ | 8.6% Ba$^{++}$ | 15.8% Ba$^{++}$. |
| G—Pb(NO$_3$)$_2$ | 0.2% Na$^+$ | 15.9% Pb$^{++}$ | 22.1% Pb$^{++}$. |
| H—AgNO$_3$ | 0.2% Na$^+$ | 12.4% Ag$^+$ | 12.8% Ag$^+$. |

[1] In this column is listed the maximum value in weight percent of the identified ions which theoretically could be placed in the mica as replacements for sodium ion.

The theoretical content of Na$^+$ in the mica of Example 1 as it comes from the furnace is about 5.9 weight percent of the composition. The approximate amount of Na$^+$ in mica sheets such as those of Example 4 is 3.1 weight percent. The lower value for the sheets of Example 4 is explained by the fact that some sodium was leached from the mica during processing.

From the table it is seen that potassium replacement for sodium in the mica structure can be accomplished to a rather substantial degree by cation exchange. Theoretically full potassium ion replacement of all the sodium in the mica composition as it comes from the furnace would require that about 9.6 weight percent of K$^+$ be present in the mica composition, as set forth in the table. The product resulting from potassium formate treatment very closely approaches this theoretical value; and in fact, the content of potassium ions in this product is greater, on an equivalent basis, than the content of sodium ion in the sheet materials of Example 4 used as the starting material for treatment. Of note from the table also is the fact that a very considerable amount of aluminum ion was taken into the mica sheet by the foregoing treatment, quite possibly in positions of the mica structure occupied by sodium ions, but conclusive evidence of this fact has not been established and it is not unlikely that some other ions of the mica structure, e.g., magnesium or lithium, were replaced by the aluminum ions.

All of the film samples resulting from the ion exchange treatment were self-supporting and high in tensile strength. They could be folded without breakage and parting at the fold line.

The chemical composition of the resulting film samples was such that in the form of bulk mica such mica would not be water-swellable and would not be capable of delamination by simple treatments as herein discussed. Despite this fact, synthetic fluorine mica of such composition can now be produced in the form of extremely thin platelets having large average diameter as afore-discussed.

EXAMPLE 8

To approximately one gallon of a 1% by weight concentration of mica platelets of Example 2 suspended in water at 22° C. was added 200 grams of $Ba(NO_3)_2$. The added salt was dissolved in the water of the mica suspension and caused the mica platelets to flocculate. The coagulated mixture then was maintained at a temperature of 75° C. for 60 hours to facilitate cation exchange of $Ba^{++}$ for $Na^+$ of the individual crystal platelets. Using the resulting platelets, a sheet was formed by the centrifuge technique as illustrated in Example 4. The sheet was water washed to remove excess barium salt (i.e., until no further test for $Ba^{++}$ was obtained when sulfate was added to the wash water), and then dried as described in Example 3. Chemical analysis of the resulting sheet showed that only 0.1% $Na^+$ remained, whereas 11.5% $Ba^{++}$ was present, indicating that the sodium of the platelets employed was substantially completely replaced by barium ion.

This example illustrates that extremely thin non-water-swelling mica platelets having a thickness not greater than 100 A.U. and an average diameter in excess of 100 A.U. can be formed, even though the composition of the platelets is characterized by being non-water-swellable.

EXAMPLE 9

To 150 ml. of water containing 2% solids of mica platelets of Example 2, was added 10 ml. of a hot concentrated solution of $Ba(NO_3)_2$ in water. The mixture was agitated to disperse the flocculating agent, $Ba(NO_3)_2$, throughout the mica dispersion, and to control the floc size so as to obtain strong flocs in essentially uniform dispersion.

Next, the mixture was poured into a standard screen-bottomed, sheet-forming container, after first pouring about one gallon of water into the container. This container was about 8 by 8 inches square on its bottom and had a removable screen of 100 mesh size fitted thereover. The added mica flocs were agitated to form a uniform mixture with all of the water in the container, and then the water drained from the bottom thereof. During drainage of the water, the mica flocs were caught on the screen in a layer. The screen and layer of mica were then removed and blotters pressed over the mica to absorb some of the excess water, after which the sheet layer of mica was carefully separated from the screen and subjected to further blotting and pressing action. Then, the sheet layer was dried on a steel plate using temperatures as illustrated in Example 3. Tough flexible sheets having a smooth printable surface and suitable for use as permanent document paper were obtained.

EXAMPLE 10

A heat- and fire-resistant ink, "Litho Oxide Black," was used to print characters on the mica sheet of Example 9. The sheet accepted the ink readily, and did not blot, soften, or fall apart. The printed sheet was then exposed to about 1000° C. for 2 hours, after which the print on the sheet was still clear and easily read.

Thus, sheets of this invention are useful as permanent fire-proof document paper. While they may at first be brittle immediately after intense heat exposure, they become flexible as they gradually absorb a small amount of moisture from the atmosphere, and retain sufficient strength after exposure to permit of handling.

Another heat- and fire-resistant ink which has been used successfully to form good fire-proof permanent document records using my sheet materials is one consisting of a mixture of about 40 parts of finely divided manganese dioxide ($MnO_2$), which is a black pigment, and about 60 parts of pine oil.

EXAMPLE 11

Fiberglass reinforced synthetic mica paper was formed by the following technique: to 250 ml. of a water suspension containing 0.6% by weight of mica platelets of Example 2 was added 1 gram of fiberglass, the glass fibers averaging about ¼ inch in length and 10 microns in diameter. The fibers had been previously treated by their manufacturer (the Owens-Corning Fiberglas Company) with a cationic surfactant to enhance their dispersion in water. The fiberglass was dispersed uniformly in the mica-water suspension by vigorous agitation by shaking. While continuing some agitation to keep the fiberglass from settling out of suspension, 10 ml. of a concentrated solution of barium nitrate in water was added, and the slurry again was vigorously agitated. Within a few second the suspension flocculated and gelled to the point where it was no longer a pourable liquid. After a few seconds of additional agitation, the mica-fiberglass-water gel was broken down into smaller mica flocs in which the fiberglass filaments were locked, and a sufficient degree of fluidity was thereby restored to the mass that it could be poured into a spinning centrifuge, which was done. It is pertinent to note that the unflocculated mica suspension with or without the addition of the fiberglass tends to pass through the filter-paper in the centrifuge, or in some cases where the platelets have extra large average diameter, they plate out in pores of the filter paper and effectively plug it, preventing drainage of water. In comparison, the large flocs of flocculated mica and fiberglass deposited evenly on the filter without plugging it or passing through it. The mica-fiberglass mat while wet had sufficient strength to permit of removing it from the centrifuge. It was then removed from the centrifuge by hand, calendered between squeeze rolls, and dried by raising it to 200° C. for 4 hours. In dry condition it was tough, could be folded without breaking, and was useful in a variety of electrical applications, particularly as insulation wrapping.

EXAMPLE 12

Metal filament (wire) reinforced synthetic mica paper was formed in a manner similar to that used for making the mica-fiberglass sheet of Example 11. Copper wire, 0.5 mil diameter, was cut into ⅛ to ¼ inch lengths. Three grams of the wire cuttings were added to 200 ml. of a water suspension of 0.75% mica platelets from Example 2. While vigorously stirring the mixture to keep the wire dispersed, 2 ml. of a concentrated aqueous solution of aluminum chloride was added to the dispersion to flocculate the mica. Within several seconds the aqueous mica-wire dispersion set to a gel, and the copper wire particles were firmly held among the mica flocs, effectively preventing gravitational settling of the heavy wire from the mica. With agitation for a few additional seconds, the size of the flocs was reduced so that the mixture was pourable into a spinning centrifuge (or drawn down on a Buchner filter). To prevent the heavy wire filaments from being forced outwardly and cutting through the platelets of mica during centrifugation, small quantities of the gelled dispersion were poured intermittently in the centrifuge and the water filtered therefrom. The filtered but still wet mica-wire mat was easily removed by hand, and then calendered, and dried to produce a tough reinforced sheet useful as a heat insulating tape or fireproof fabric.

EXAMPLE 13

Coarse flakes of natural mica (muscovite) were bonded with my synthetic mica platelets into a sheet material. The synthetic mica served to give perceptibly greater wet strength to the reconstituted mica sheet than was attainable with the natural mica alone. The synthetic mica platelets hereof may also serve as the basis of a compatible, flexible inorganic bond for natural mica, such a bond being obtainable by hot-pressing techniques.

Three grams of flakes of natural mica (100-mesh to about ⅛ inch in average diameter as above defined), were dispersed in a 100 ml. water suspension containing 1% by weight of mica platelets of Example 2 in a colloidal state. The mixture was poured into a Buchner suction filter and water removed to form the two types of mica particles into a sheet. After calendering and drying, the composite sheet showed good strength properties and markedly greater resistance to water disintegration than did a 100% natural mica sheet. The 100% natural mica sheet literally fell apart upon immersion in water, whereas the product of this example could be immersed and withdrawn from the water several times without falling apart as a result of necessary handling of it during the test.

In a similar way and with similar results, my platelets of water-swelling tetrasilicic fluorine-mica have been used to bond coarse prior art flakes of other types of mica including fluor-phlogopite ($KMg_3AlSi_3O_{10}F_2$), and coarse flakes of the water-swelling mica itself.

EXAMPLE 14

Sheets resulting from the bath treatments G and H of Table I, Example 7, were subjected to the reducing action of illuminating gas while heating them. For the lead containing sheet (bath G), 700° C. was used; for the silver containing sheet (bath H), 550° C. Both sheets were white prior to treatment and became black as a result of this treatment, indicating that lead and silver were reduced and formed thin layers on each respective sheet. The resulting lead and silver layers were each firmly bonded to underlying mica in the sheet structure. Presumably some of the reduced metal of the layers occupied vacant sites of the crystalline structure of the mica which ordinarily are occupied by metal ions in mica as it comes from the furnace.

Using the foregoing technique, laminates may be prepared to which other metals may readily be brazed. For example, copper may be brazed to silver or lead films on an underlying mica layer to provide a composite structure having a strong bond between the conductive and non-conductive components.

Most of the various embodiments of my invention find particular utility in the electrical insulation field. But the extraordinarily thin, large-surface-area platelets hereof may be useful in other fields, particularly where extremely thin platelets of mica are needed. Sheet materials of my invention may be employed as part of structural laminates with plastic, metal or other types of films. They may be used as insulating tapes, in capacitors, etc.

The foregoing disclosure is offered to illustrate but not limit my invention, as further set forth in the appended claims.

That which is claimed is:

1. A method of forming extremely thin discrete flexible platelets of synthetic fluorine mica comprising exposing water-swelling synthetic tetrasilicic fluorine mica to sufficient water to pass by absorption into the crystalline structure of said mica along planes of potential basal cleavage thereof, to thereby hydrate said mica with sufficient water absorbed along said planes of potential basal cleavage to effect swelling of said mica, and then heating said hydrated mica to a temperature in the range of about 300 to 550° C., whereby said water absorbed along the cleavage planes of said mica is converted to steam and causes exfoliation of said synthetic mica along said basal cleavage planes.

2. The method of forming extremely thin discrete flexible platelets of synthetic non-water-swellable mica including the steps of exposing water-swelling synthetic tetrasilicic fluorine mica to sufficient water to pass by absorption into the crystalline structure of said mica along planes of potential basal cleavage thereof, to thereby hydrate said mica with sufficient water absorbed along said planes of potential basal cleavage to effect swelling of said mica, heating said hydrated water-swelling mica to a temperature in the range of 300 to 550° C., whereby said water absorbed along the cleavage planes of said mica is converted to steam and causes exfoliation of said synthetic mica separating it along said basal cleavage planes, separating said exfoliated mica into discrete platelets, and conducting an ion exchange reaction whereby some of the cations in said water-swelling mica platelets are replaced by cations different from those originally present in the structure of said platelets, said resulting platelets of mica analyzing to contain cations in a structure which is characteristic of synthetic fluorine micas that are not water-swelling.

3. The method of forming extremely thin discrete flexible platelets of synthetic fluorine mica comprising exposing water-swelling synthetic tetrasilicic fluorine mica to sufficient water to pass by absorption into the crystalline structure of said mica along planes of potential basal cleavage thereof, to thereby hydrate said mica with sufficient water absorbed along said planes of potential basal cleavage to effect swelling of said mica, heating to a temperature not in excess of 550° C. said hydrated mica to convert the water absorbed along the cleavage planes of said mica to steam and cause exfoliation of said mica, dispersing said exfoliated mica in a liquid volatile vehicle, and further delaminating said exfoliated mica in said vehicle into platelets having a thickness not in excess of 100 A.U. and having large surface areas in terms of diameter across planes of basal cleavage perpendicular to their thickness, the ratio of average diameter to thickness of said platelets being in excess of 100.

4. The method of claim 3 wherein the exfoliated mica is dispersed in a liquid volatile vehicle containing a chemically reactive material which penetrates said mica between layers of its structure, and wherein the treatment of said exfoliated mica in said vehicle involves adding to said vehicle an agent that chemically reacts with the chemically reactive material penetrated between layers of the structure of said mica and causes gas to be released during the reaction.

5. A method of forming synthetic fluorine mica sheet materials characterized by having high tensile strength and by being foldable without fracture at the crease line of the fold, said method comprising exposing water-swelling tetrasilicic fluorine mica to sufficient water to pass by absorption into the crystalline structure of said mica along planes of potential basal cleavage thereof, to thereby hydrate said mica with sufficient water absorbed along said planes of potential basal cleavage to effect swelling of said mica, heating said hydrated mica to a temperature in the range of about 300 to 550° C. to convert water absorbed along planes of basal cleavage to steam and effect exfoliation of said synthetic mica along said basal cleavage planes, dispersing said exfoliated mica in a liquid volatile vehicle, further delaminating said exfoliated mica into platelets having a thickness not in excess of 100 A.U. and having large surface areas in terms of diameter across planes of basal cleavage perpendicular to their thickness, the ratio of average diameter to thickness of said platelets being in excess of 100, and depositing said platelets in overlapping intimate contact with adjacent platelets so as to form a sheet material which is handleable and self-supporting when essentially free of said liquid volatile vehicle.

6. The method of claim 5 including, in addition, the step of subjecting said sheet material to an ion exchange reaction whereby some of the cations in said water-swelling mica platelets are replaced by cations different from those originally present in the structure of said platelets.

7. The method of forming synthetic fluorine mica platelets and reinforcing fibers into a reinforced synthetic mica sheet material, said method comprising forming a dispersion of synthetic mica platelets and said reinforcing fibers in a liquid media, said platelets having thickness not in excess of 100 A.U. and having a ratio of average diameter to thickness in excess of 100, adding a flocculating agent to flocculate said platelets about said reinforcing fibers, thereby to hold said fibers suspended in said liquid, and forming said suspended material into a layer.

8. The method of forming a structure of synthetic fluorine mica having reduced metal as a part thereof, said method including the step of reducing a metal ion component of synthetic tetrasilicic fluorine mica platelets, on the surface of a sheet comprising the same, to a reduced metal state while said metal ion is present as a component part of said mica structure, whereby firmly retained reduced metal is produced at the surface of said sheet.

9. A mass of discrete flexible platelets of synthetic tetrasilicic fluorine mica, said platelets having a thickness not in excess of 100 A.U. and having large surface areas in terms of diameter across planes of basal cleavage perpendicular to their thickness, the ratio of average diameter to thickness of said platelets being in excess of 100.

10. A mass of synthetic tetrasilicic fluorine mica in the form of discrete flexible platelets, said platelets having a thickness not in excess of 100 A.U. and having large surface areas in terms of diameter across planes of basal cleavage perpendicular to their thickness, the ratio of average diameter to thickness of said platelets being in excess of 100.

11. A mass of discrete flexible platelets of synthetic water-swelling tetrasilicic fluorine mica, said platelets having a thickness not in excess of 100 A.U. and having large surface areas in terms of diameter across planes of basal cleavage perpendicular to their thickness, the ratio of average diameter to thickness of said platelets being in excess of 100.

12. A mass of synthetic non-water-swellable tetrasilicic fluorine mica in the form of discrete flexible platelets of said non-water-swellable mica, said platelets having a thickness not in excess of 100 A.U. and having large surface areas in terms of diameter across planes of basal cleavage perpendicular to their thickness, the ratio of average diameter to thickness of said platelets being in excess of 100.

13. A stable colloidal suspension of discrete flexible synthetic tetrasilicic fluorine mica platelets in a liquid vehicle, said platelets having a thickness not in excess of 100 A.U. and having large diameters across planes of basal cleavage perpendicular to their thickness, the ratio of average diameter to thickness of said platelets being in excess of 100.

14. A flexible mica sheet material product comprising a mass of discrete flexible platelets of synthetic tetrasilicic fluorine mica, said discrete platelets having a thickness not in excess of 100 A.U. and having large surface areas in terms of diameter across planes of basal cleavage perpendicular to their thickness, the ratio of average diameter to thickness of said platelets being in excess of 100.

15. The sheet material product of claim 14 containing platelets of mica of larger thickness than 100 A.U. distributed throughout said sheet material product.

16. A flexible mica sheet product having high tensile strength and adapted to be folded without fracture at the crease line of said fold, said sheet product consisting essentially of discrete flexible platelets of synthetic tetrasilicic fluorine mica randomly oriented and overlapped upon each other with the planes of basal cleavage of said platelets in intimate contact, said discrete platelets having a thickness not in excess of 100 A.U. and having large diameters across planes of basal cleavage perpendicular to their thickness, the ratio of average diameter to thickness of said platelets being in excess of 100.

17. A flexible mica sheet product having high tensile strength and adapted to be folded without fracture at the crease line of said fold, said sheet product being formed so as to include discrete flexible platelets of synthetic tetrasilicic fluorine mica, said platelets being randomly oriented and overlapped upon each other with many of the planes of basal cleavage of said platelets in initimate coherent contact, said platelets having a thickness not in excess of 100 A.U. and having large diameters across planes of basal cleavage perpendicular to their thickness, the ratio of average diameter to thickness of said platelets being in excess of 100.

18. A mica sheet material of improved mechanical strength comprising a filler material and discrete flexible platelets of synthetic tetrasilicic fluorine mica about said filler material in said sheet material, said platelets having a thickness not in excess of 100 A.U. and having large surface areas in terms of diameter across planes of basal cleavage perpendicular to their thickness, the ratio of average diameter to thickness of said platelets being in excess of 100.

19. A filament reinforced mica sheet material of improved tensile and flexural strength properties, said sheet material comprising discrete flexible platelets of synthetic tetrasilicic fluorine mica randomly oriented and overlapped upon each other, and short filaments of reinforcing material distributed throughout said sheet, said discrete platelets having a thickness not in excess of 100 A.U. and having large surface areas in terms of diameter across planes of basal cleavage perpendicular to their thickness, the ratio of average diameter to thickness of said platelets being in excess of 100.

20. A firm and strong mica-to-metal structure comprising as its essential parts a layer of synthetic tetrasilicic fluorine mica and a layer of reduced metal lying on said mica with at least part of the reduced metal of said layer occupying vacant sites of the crystalline structure of said mica which are ordinarily occupied by metal ions in conventional mica structures.

21. In a method of forming extremely thin discrete flexible platelets of synthetic fluorine mica, the steps of exposing water-swelling synthetic tetrasilicic fluorine mica to sufficient water to pass by absorption into the crystalline structure of said mica along planes of potential basal cleavage thereof, to thereby hydrate said mica with sufficient water absorbed along said planes of potential basal cleavage to effect swelling of said mica, and agitating said hydrated mica while at a temperature not in excess of 550° C. so as to delaminate it into platelets having a thickness not in excess of 100 A.U. and having large surface areas in terms of diameter across planes of basal cleavage perpendicular to their thickness, the ratio of average diameter to thickness of said platelets being in excess of 100.

22. The method of forming extremely thin discrete flexible platelets of synthetic fluorine mica comprising exposing water-swelling synthetic tetrasilicic fluorine mica to sufficient water to pass by absorption into the crystalline structure of said mica along planes of potential basal cleavage thereof, to thereby hydrate said mica with sufficient water absorbed along said planes of potential basal cleavage to effect swelling of said mica, and heating to a temperature not in excess of 550° C. and agitating said hydrated mica to cause delamination of said mica into platelets having a thickness not in excess of 100 A.U. and having large surface areas in terms of diameter across planes of basal cleavage perpendicular to their thickness, the ratio of average diameter to thickness of said platelets being in excess of 100.

References Cited in the file of this patent

UNITED STATES PATENTS

| | | |
|---|---|---|
| 1,972,390 | Miner | Sept. 4, 1934 |
| 2,017,904 | Keeth | Oct. 22, 1935 |
| 2,215,295 | Morrill | Sept. 17, 1940 |
| 2,549,880 | Bardet | Apr. 24, 1951 |
| 2,614,055 | Senarclens | Oct. 14, 1952 |
| 2,659,412 | Heyman | Nov. 17, 1953 |
| 2,675,853 | Hatch et al. | Apr. 20, 1954 |
| 2,709,158 | Bouchet | May 24, 1955 |
| 2,778,713 | Noda | Jan. 22, 1957 |
| 2,863,720 | Barr | Dec. 9, 1958 |
| 2,865,426 | Heyman | Dec. 23, 1958 |

UNITED STATES PATENT OFFICE
CERTIFICATION OF CORRECTION

Patent No. 3,001,571                September 26, 1961

Robert A. Hatch

It is hereby certified that error appears in the above numbered patent requiring correction and that the said Letters Patent should read as corrected below.

Column 4, line 2, for "mica" read -- micas --; column 7, line 36, for "us" read -- use --; line 71, for "films" read -- film --; column 14, line 17, and column 15, line 2, for "an ion", each occurrence, read -- a cation --.

Signed and sealed this 3rd day of April 1962.

(SEAL)
Attest:

ERNEST W. SWIDER               DAVID L. LADD
Attesting Officer               Commissioner of Patents